(No Model.)
R. M. HUNTER.
ELECTRIC RAILWAY.
No. 456,513. Patented July 21, 1891.
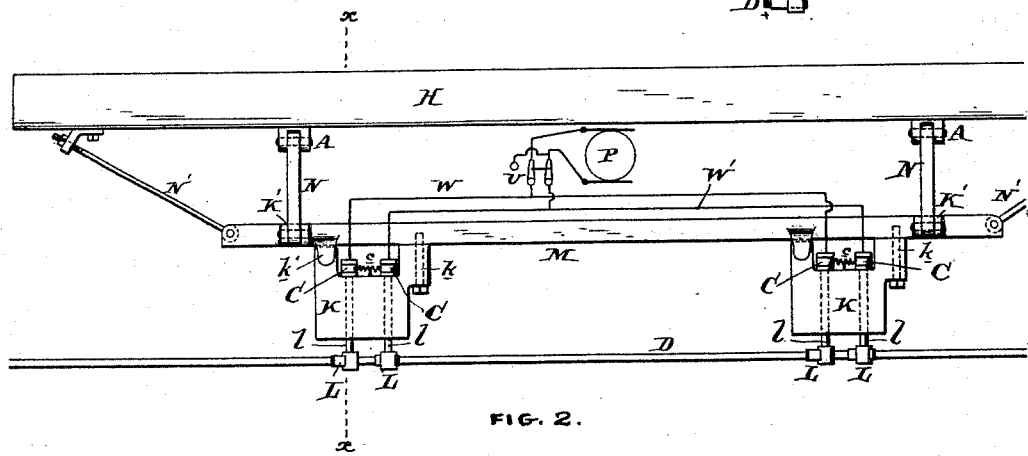

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 456,513, dated July 21, 1891.

Original application filed July 14, 1885, Serial No. 171,625. Divided and this application filed October 10, 1889. Serial No. 326,631. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements which are fully set forth in the following specification and shown in the accompanying drawings, which form a part thereof.

This application (Case 114) is a division of my application, Serial No. 171,625, of July 14, 1885.

My invention has particular reference to current-collecting devices for electrically-propelled vehicles and is adapted to collect the current from a line conductor or conductors extending along the railway or line of travel of the vehicle and supply it to electric motors or other translating devices carried by or moving with the vehicle.

In carrying out my invention I provide the vehicle with an electric motor to propel it and with a current-collecting device so arranged that it shall be moved with the vehicle and shall have freedom to lateral motion at its free end or part which comes in contact with the conductor by having the collector portion movable both laterally and about a vertical axis. Furthermore, the current-collecting device as a whole is normally supported in a vertical position by means of springs acting upon a portion pivoted to the vehicle on a longitudinal axis. There may be one or more of these current-collecting devices, and they, furthermore, may be adapted to collect positive and negative currents. The contact devices move in connection with the conductor at a point to the rear of the vertical axis about which the current-collecting device is pivoted in its connection with the vehicle, thereby giving to the collector as an entirety a trailing connection. The collector is hinged to the vehicle and may consist of more than one part—that is to say, there may be a primary part movably connected to the vehicle and a secondary part carrying the contact device supported by the primary part, with freedom of lateral movement at its end, where it comes in contact with the conductor. The details may be varied greatly to suit the requirements of the case, and if two line or supply conductors are employed then a double collector-contact must be employed.

My improvements will be more fully understood by referring to the accompanying drawings, in which—

Figure 1 is a cross-section on line $xx$ of Fig. 2, illustrating my improved current-collecting device. Fig. 2 is a side elevation of the current-collecting device embodying my improvements. Fig. 3 is a side elevation illustrating the electrically-propelled vehicle and showing one arrangement of the current-collectors in relation to the wheels; and Fig. 4 is a modification of one portion of the collector, the view being taken similar to that shown in the lower part of Fig. 1.

H is the vehicle, and is provided with an electric motor B, which, through suitable gearing Q connecting with the axles, enables it to be propelled over a railway, of which R represents the rails.

M is a laterally-movable frame, which is supported from the vehicle H by means of links N, hinged to the lugs K' on said frame on the longitudinal axes, and these links N are hinged to frames A, also by longitudinal axes, and, furthermore, said links are held normally in a vertical position by springs B, acting upon lugs $n$, projecting laterally from said links N. By this means it is seen that the frame M is free to swing laterally with respect to the vehicle and is movable about longitudinal axes. To reduce the strain upon links N, drag-bars N' may be employed, and these would be connected to the ends of the frame M and to the vehicle-body H, as indicated in Figs. 2 and 3. If the links are made short, these drag-bars may be dispensed with.

Pivoted to the frame M on vertical axes $k$ are the frames K, which frames extend rearwardly and are free to swing about said vertical axes $k$, but are normally held in line by means of the springs $k^2$, arranged between the said frames K and lugs $k'$, extending from the frame M.

The contact devices L may be of any suitable construction and are secured to vertical shafts l, which extend through the plates or frame K, and are provided at their ends nearest to the vehicle with crank-arms C, which are connected to springs c, acting to rotate the contact devices L upon their vertical axes and maintain a contact with the conductor or conductors extending along the railway. As shown, two of these collector frames or parts K are arranged at a distance apart and one in front of the other in the line of travel of the vehicle, and both parts K are hinged to the vehicle at their forward ends and have their rear ends free and provided with the contact portion or portions proper. It will thus be seen that in this construction we have a conductor for supplying electricity extending along an electric railway, an electrically-propelled vehicle, and an intermediate contact device supported independently of the supply or line conductor and maintaining a traveling connection therewith and having a free swiveling movement about a vertical axis. Furthermore, in this construction we have a contact device connected to the vehicle or car by a joint permitting freedom of movement about a vertical axis and a spring partaking of the said movement about a vertical axis and maintaining the traveling engagement between the contact device and the supply-conductor. This is seen when we consider the frame or plate K, movable about the vertical axis k, and thereby jointed to the car through frame M and carrying the contact device L, and the spring c partaking of the rotary movement about k. Furthermore, it is clear that we have a contact device consisting of two parts hinged together with a spring, constantly holding the contact or outer part in engagement with the supply or line conductor and the contact device as a whole jointed to the vehicle or car on a vertical axis k and movable freely in either direction. It is also apparent that in this construction we have an intermediate contact device having at one end a contact pressed against the supply or line conductor and at the other end a jointed connection with the vehicle or car, permitting movement of the contact device about a vertical axis. Such construction also embodies a contact device having its weight supported by the vehicle, and consisting of a primary part having freedom of movement about a vertical axis and carrying a spring-pressed contact-piece, said spring-pressed piece operating in connection with the supply or line conductor. The line of connection between the point of connection with the vehicle and the contact with the conductor is oblique, and the latter is in the rear of the former, producing a trailing effect.

When two supply or line conductors D D are employed for supplying positive and negative current, two independent spring-actuated contacts L L are employed, and each of which follows the irregularities of its own conductor. In this case these two spring-actuated contacts are connected to the vehicle through a primary part. It is evident that this collecting device should be located in suitable position on the car to make contact with the line conductor or conductors, and it is constructed in such a manner that it is self-supporting and tends always to bring its parts to a normal position in line of travel of the vehicle or car.

W W' represent motor-circuits and supply current from the contact L to the motor P, and the current-reversing switch or suitable regulator U may be employed in said motor-circuits.

It is quite evident that in place of the short rod l (shown in Fig. 1) said rod may be lengthened, if desired, as indicated in Fig. 4.

It is evident that the vertical axis of the frame K is carried by the car body or frame of the vehicle in such a manner that the said frame K, carrying the spring-actuated contact device, is maintained in elastic position for the purpose of insuring contact with the conductor.

The parts may be varied as to details and may be increased or decreased in dimensions as may suit the requirements of any particular case, and hence I do not limit myself to the particular shapes of the parts shown.

Having now described my invention, what I claim as new, and desire to secure by Letters Patent, is—

1. The combination of an electric conductor extending along an electric railway, an electrically-propelled vehicle, a frame supported by the vehicle and laterally movable, and an intermediate contact device supported thereby and independently of the conductor, but maintaining a traveling connection therewith and having a self-sustaining free swiveling movement about a vertical axis.

2. The combination of an electric conductor extending along an electric railway, an electrically-propelled vehicle, a laterally-movable frame carried by the vehicle, and an intermediate contact device having its weight supported by the vehicle and consisting of a primary part having freedom of movement about a vertical axis carried by the laterally-movable frame and a contact-piece carried by said primary part and spring-pressed against the supply-conductor.

3. The combination, in an electric railway, of an electric conductor extending along the railway, an electrically-propelled car or vehicle, and a laterally-movable contact device supported by the vehicle and having at one end a contact-spring pressed against the conductor and at its other end a jointed connection to the vehicle permitting movement of the contact device about a vertical axis.

4. The combination, in an electric railway, of a conductor extending along the railway, an electrically-propelled vehicle or car, and a contact device consisting of a primary part extending rearward and hinged at its forward end to the vehicle on a vertical axis and carrying at its rear end a contact making a traveling connection with the conductor.

5. The combination, in an electric railway, of a conductor extending along the railway, an electrically-propelled vehicle or car, and a contact device consisting of a primary part extending rearward and hinged at its forward end to the vehicle on a vertical axis and carrying at its rear end a spring-actuated contact making a traveling connection with the conductor.

6. The combination, in an electric railway, of a conductor extending along the railway, an electrically-propelled vehicle or car, and a contact device consisting of a primary part extending rearward and hinged at its forward end to the vehicle on a vertical axis and carrying at its rear end a contact making a traveling connection with conductor, and a laterally-movable frame intermediate between the contact device and vehicle.

7. The combination, in an electric railway, of a conductor extending along said railway, an electrically-propelled vehicle, and an intermediate contact device hinged to the vehicle at the forward end and having its rear end provided with a contact making a traveling connection with the conductor.

8. The combination, in an electric railway, of a conductor extending along said railway, an electrically-propelled vehicle, and an intermediate contact device hinged to the vehicle at the forward end and having its rear end provided with a spring-actuated contact making a traveling connection with the conductor.

9. The combination, in an electric railway, of an electric conductor extending along said railway, an electrically-propelled vehicle, a contact device supported thereby and consisting of a rearwardly-extending part hinged to the vehicle at its forward end, a spring to normally maintain said part in the line of travel of the vehicle, and a contact carried by said rearwardly-extending part and making a traveling connection with the conductor.

10. The combination, in a railway, of an electric conductor extending along said railway, an electrically-propelled vehicle, a contact device consisting of a part hinged or flexibly connected to the vehicle and laterally movable at its free end to or from the conductor, and a contact carried on the free end of said part making a connection with the conductor.

11. In an electric railway, the combination of an electric conductor extending along the railway, a traveling vehicle, and a contact device carried by the vehicle and movable as an entirety laterally and making a traveling connection with the conductor.

12. In an electric railway, the combination of an electric conductor extending along the railway, a traveling vehicle, a contact device carried by the car, movable laterally and making a traveling connection with the conductor, and a spring to hold said contact device against the lateral face of the conductor.

13. In an electric railway, the combination of an electric conductor extending along the railway, a traveling vehicle, and a contact device hinged to and supported by the vehicle and normally held in a vertical plane and having a contact part making a traveling connection with the conductor.

14. In an electric railway, the combination of an electric conductor extending along the railway, a traveling vehicle, and a contact device hinged to and supported by the vehicle and normally held in a vertical plane by a spring device and having a contact part making a traveling connection with the conductor.

15. In an electric railway, the combination of an electric conductor extending along the railway, a traveling vehicle, and a contact device for making contact with the conductor, supported by the vehicle and normally held in an upright position, with provision for lateral movement.

16. In an electric railway, the combination of an electric conductor extending along the railway, a traveling vehicle, and a contact device for making contact with the conductor, supported by the vehicle by a hinge-joint and normally held in an upright position, with provision for lateral movement.

17. In an electric railway, the combination of an electric conductor extending along the railway, a traveling vehicle, and a contact device for making a traveling connection with the conductor, connected at one end to the vehicle, with provision for lateral movement at its end adjacent to the conductor.

18. In an electric railway, the combination of an electric conductor extending along the railway, a traveling vehicle, a contact device for making a traveling connection with the conductor, connected at one end to the vehicle, with provision for lateral movement at its end adjacent to the conductor, and a spring device to normally hold or tend to hold said contact device in a vertical position.

19. In an electric railway, the combination of an electric conductor extending along the railway, a traveling vehicle, a contact device for making a traveling connection with the conductor, connected at one end to the vehicle by a hinge-joint and with provision for lateral movement at its end adjacent to the conductor, and spring devices for holding said contact device against the conductor.

20. In an electric railway, the combination of an electric conductor extending along the railway, a traveling vehicle, a rearwardly-extending contact device jointed to the vehicle at its forward end and making a contact with the conductor at its rear and free end, and spring devices to normally tend to hold said contact device in a vertical plane in the line of travel of the vehicle.

21. In an electric railway, the combination of an electric conductor extending along the railway, a traveling vehicle, a contact device as an entirety hinged to the vehicle on an axis arranged transversely to the length of the conductor and movable toward the conductor, and a spring to press said contact device against the conductor with an elastic pressure.

22. In an electric railway, the combination of an electric conductor extending along the railway, a traveling vehicle, a rearwardly-extending contact device hinged to the vehicle at its forward end and having its rear or free end movable toward the conductor, and a spring to press said contact device against the conductor with an elastic pressure.

23. In an electric railway, the combination of a conductor extending along the railway, a car having the body supported on the axles by means of springs, and a laterally-movable contact device hinged to the car-body and making a traveling contact with the conductor.

24. In an electric railway, the combination of a conductor extending along the railway, a car having the body supported on the axles by means of springs, and a rearwardly-extending laterally-movable spring-actuated contact device hinged to the car-body and making a traveling contact with the conductor.

25. In an electric railway, the combination of a conductor extending along the railway, a car having the body supported on the axles by means of springs, a rearwardly-extending contact device hinged to the car-body and making a traveling contact with the conductor, and spring devices to press the rear end of the contact device into electrical contact with the conductor.

26. In an electric railway, a railway-track and an electric conductor extending along said track, arranged at different elevations, a traveling vehicle on the track, and a contact device carried by the vehicle, extending to the conductor, and movable about a vertical axis.

27. In an electric railway, a railway-track and an electric conductor extending along said track, arranged at different elevations, a traveling vehicle on the track, and a rearwardly-extending contact device carried by the vehicle, extending to the conductor at its rear or free end, and movable about a vertical axis.

28. In an electric railway, a railway-track and an electric conductor extending along said track and at a different elevation, a traveling car having a body part supported on the axles by springs, an electric motor mechanically connected with the axle, a contact device carried by the car-body independent of the axles and extending to the conductor, and motor-circuits between the electric motor and collector.

29. In an electric railway, a railway-track and an electric conductor extending along said track and at a different elevation, a traveling car having a body part supported on the axles by springs, an electric motor mechanically connected with the axle, and a contact device carried by the car-body independent of the axles and extending to the conductor and movable about a vertical axis.

30. In an electric railway, a railway-track and an electric conductor extending along said track and at a different elevation, a traveling car having a body part supported on the axles by springs, an electric motor mechanically connected with the axle, and a spring-actuated contact device carried by the car-body independent of the axles and extending to the conductor and movable about a vertical axis.

31. In an electric railway, a railway-track and an electric conductor extending along said track and at a different elevation, a traveling car having a body part supported on the axles by springs, an electric motor mechanically connected with the axle, and a rearwardly-extending and laterally-movable contact device carried by the car-body independent of the axles and extending to the conductor.

32. In an electric railway, a railway-track and an electric conductor extending along said track and at a different elevation, a traveling car having a body part supported on the axles by springs, an electric motor mechanically connected with the axle, and a rearwardly-extending and laterally-movable spring-actuated contact device carried by the body independent of the axles and extending to the conductor.

33. The combination of a railway, two electric conductors extending along said railway, a traveling vehicle, and two contact devices connected to the vehicle at their forward ends and provided with contacts resting against the conductors.

34. The combination of a railway, two electric conductors extending along said railway, a traveling vehicle, and two spring-actuated contact devices connected at their forward ends to the vehicle and having their rear ends provided with contacts resting against the conductors.

35. The combination of a railway, two electric conductors extending along said railway, a traveling vehicle, and two contact devices connected at their forward ends to the vehicle by hinged joints and having their rear ends laterally movable and provided with contacts resting against the conductors.

36. The combination of a railway, two electric conductors extending along said railway, a traveling vehicle, two contact devices connecting at their forward ends to the vehicle by hinged joints and having their rear ends laterally movable and provided with contacts resting against the conductors, and springs to press said contact devices into elastic connection with the conductors.

37. In an electric railway, the combination of an electric conductor extending along the railway, a traveling vehicle, and a rearwardly-extending contact device for making contact with the conductor, supported by the vehicle and held in an upright position, with provision for lateral movement.

38. In an electric railway, the combination of two insulated conductors extending along the railway, an electrically-propelled vehicle having an electric motor, a frame movably connected to the vehicle, and two independently-movable spring-actuated contact devices carried by said frame and making a moving contact with the respective conductors for supplying current to the motor.

39. In an electric railway, the combination of two insulated conductors extending along the railway, an electrically-propelled vehicle having an electric motor, a frame movably connected to the vehicle, with provision for lateral movement, and two independently-movable spring-actuated contact devices carried by said frame, with provision for movement to or from the conductors and making a moving contact with the respective conductors for supplying current to the motor.

40. In an electric railway, the combination of two insulated conductors extending along the railway, an electrically-propelled vehicle having an electric motor, a frame movably connected to the vehicle, with provision for lateral movement, and two independently-movable spring-actuated contact devices carried by said frame, each movable about a vertical axis and making a moving contact with the respective conductors for supplying current to the motor.

41. In an electric railway, a railway-track and an electric conductor extending along said track, arranged at different elevations, a traveling vehicle on the track, and a spring-actuated contact device carried by the vehicle, extending to the conductor, and movable about a vertical axis.

42. In an electric railway, a railway-track and an electric conductor extending along said track, arranged at different elevations, a traveling vehicle on the track, and a rearwardly-extending spring-actuated contact device carried by the vehicle, extending to the conductor at its rear or free end, and movable about a vertical axis.

In testimony of which invention I have hereunto set my hand.

RUDOLPH M. HUNTER.

Witnesses:
ERNEST HOWARD HUNTER,
S. T. YERKES.